(12) United States Patent
Munroe

(10) Patent No.: US 6,342,887 B1
(45) Date of Patent: Jan. 29, 2002

(54) METHOD AND APPARATUS FOR REPRODUCING LIGHTING EFFECTS IN COMPUTER ANIMATED OBJECTS

(76) Inventor: Earl Robert Munroe, 488 Warminster Drive, Oakville, Ontario (CA), L6L 4N3

( * ) Notice: Subject to any disclaimer, the term of this patent is extended or adjusted under 35 U.S.C. 154(b) by 0 days.

(21) Appl. No.: 09/195,428

(22) Filed: Nov. 18, 1998

(51) Int. Cl.$^7$ .............................................. G06T 15/60
(52) U.S. Cl. ...................................... 345/426; 345/419
(58) Field of Search ................................. 345/426, 419

(56) References Cited

U.S. PATENT DOCUMENTS

| | | | | |
|---|---|---|---|---|
| 4,554,587 A | * | 11/1985 | Ooi et al. .................... | 358/228 |
| 4,669,840 A | * | 6/1987 | Samuelson .................. | 352/170 |
| 5,485,556 A | * | 1/1996 | Takagi et al. ............... | 395/126 |
| 5,710,876 A | * | 1/1998 | Peercy et al. ............... | 395/126 |
| 5,841,530 A | * | 11/1998 | Hewitt et al. ............... | 356/237 |
| 5,895,135 A | * | 4/1999 | Funaki ....................... | 396/319 |
| 5,903,271 A | * | 5/1999 | Bardon et al. .............. | 345/419 |
| 6,069,659 A | * | 5/2000 | Nakajima ................... | 348/371 |
| 6,078,333 A | * | 6/2000 | Witting et al. .............. | 345/426 |
| 6,084,590 A | * | 7/2000 | Robotham et al. .......... | 345/419 |
| 6,101,272 A | * | 8/2000 | Noguchi ..................... | 382/167 |

\* cited by examiner

Primary Examiner—Mark Zimmerman
Assistant Examiner—Lance W. Sealey

(74) Attorney, Agent, or Firm—Dimock Stratton Clarizio; Mark B. Eisen

(57) ABSTRACT

A method and apparatus for reproducing real-world lighting effects in a computer animated object, in which a three dimensional virtual set is created in proportion to the physical set, optical parameters of each physical light source used on the real-world set are input into the model and qualified by effects such as dimming, filtration, diffusion, occlusion and attenuation to produce synthetic lighting of the virtual set. The camera lens transmission characteristics and film speed may also be incorporated into the virtual set parameters. The three dimensional computer animated object is positioned and oriented within the virtual set according to the position and orientation in which the visual effect is to appear in the cinematographic scene, and is thus synthetically 'illuminated' within the virtual set in exactly the manner that a physical object of the same shape in the physical set would be illuminated, to produce a computer animated object that exhibits lighting effects as would appear in a comparable physical object photographed through the same camera lens using the same film as used in the physical set. The invention thus eliminates most of the judgment required on the part of a visual effects artist trying to reproduce in a computer animated object the lighting effects used in a cinematographic scene, and thus significantly reduces the time required to integrate the visual effect object into the cinematographic scene. Inherent characteristics of many light sources, filters, cameras and films can be maintained in a database or look-up table and can thus be entered into the virtual set by reference to the actual light sources and camera used on the real-world set.

18 Claims, 2 Drawing Sheets

METHOD AND APPARATUS FOR REPRODUCING LIGHTING EFFECTS IN COMPUTER ANIMATED OBJECTS

FIELD OF THE INVENTION

This invention relates to computer animation and visual effects. In particular, this invention relates to a method and apparatus for reproducing real-world lighting effects in a three dimensional computer animated object.

BACKGROUND OF THE INVENTION

Visual effects used in movies and television programs have become extremely sophisticated in recent years. Older, more cumbersome methods of creating three dimensional physical models of fictitious creatures and objects and animating them on a scaled-down physical set through frame-by-frame motion manipulation have largely been replaced by the widespread availability of software for creating "three dimensional" computer models of animated objects, so-called because they exhibit surface qualities and lighting effects which simulate those of a three dimensional object. It is now commonplace to create a three dimensional computer model of an object and integrate the animated object as a visual effect into a cinematographic scene, which is a more realistic and more versatile method of creating visual effects creatures and objects.

Three dimensional computer-generated images of animated characters and objects can be modeled to be extremely realistic in appearance. The most popular computer programs presently available for creating three dimensional computer animated objects allow the animator to create a model of an object in three dimensions, specify the position of one or more synthetic light sources, and then apply basic rules of theoretical optics to generate lighting effects which mimic realistic three dimensional reflection patterns along the contours of the various surfaces of the model. This method has proven satisfactory for creating animated objects within an animated setting, because all of the images in the frame are subjected to the same synthetic light sources and all lighting effects are processed according to the same rules.

However, such a commercially available computer modeling programs cannot create a realistic visual effect object for integration into a real-world cinematographic scene. This is a much more difficult problem, because the computer animated object must blend seamlessly, and be consistent in all respects, with the images of the physical objects with which the visual effect will coexist in the cinematographic scene. Otherwise the visual effect will not be realistic and will lose its entertainment value to today's sophisticated viewers.

One of the most important factors affecting the degree of realism obtained when an animated object is integrated with a real-world cinematographic object is consistency between the real-world and animated lighting effects. In order for the computer animated object to be perceived by a viewer as properly belonging within a real-world scene, synthetic lighting effects on the animated object must be perfectly consistent with the physical lighting effects that a comparable physical object would exhibit if placed on the physical set in the same position as the animated object. Even slight deviations in shadowing, reflection angles, coloring or light intensity are perceived by the viewer as anomalies, either consciously or unconsciously, and can significantly reduce or destroy the believability of the visual effect.

Conventional methods for integrating computer animated objects into real-world cinematographic objects involve first shooting the cinematographic scene on a physical set, with stationary and moving objects as they will appear in the finished cinematographic scene. The physical set and the objects in it are carefully illuminated by various types of light sources selected, positioned, oriented and often modified (eg. by dimmers and filters) according to the lighting effects desired to be achieved in each particular scene. A three dimensional model of the visual effects object is then created on a computer and processed by conventional modeling software, and the image is superimposed onto each frame of the cinematographic scene to create the composite cinematographic picture.

The basic optical parameters used in conventional three dimensional modeling software can be used to provide a starting point for the rendering of computer animated three dimensional objects for use as visual effects objects. However, the result is invariably unsuitable when the animated object is incorporated into a real-world scene because these parameters are developed from theoretical optics principles and do not factor in many real-world optical parameters. As such, the synthetic lighting of the animated object can never match the actual lighting effects applied to objects on the physical set as manifest in the cinematographic reproduction.

Thus, after incorporating the computer animated object into the cinematographic scene the animated object must be altered to be consistent with the lighting effects used on the physical set. This is a painstaking process which generally takes days or weeks of skilled visual effects artists adapting each shot, sometimes frame by frame, to match the lighting of each computer animated object with the lighting effects that would be exhibited by a comparable physical object on the physical set.

Apart from the tremendous cost involved in such an undertaking it is virtually impossible using this method, even for the most highly skilled visual effects artist, to achieve an exact reproduction of the lighting effects on the physical set so that the incorporation of an independently created computer animated object into the real-world cinematographic object is completely realistic. There are thousands of shades and hues of each colour in the spectrum, and while the human eye is capable of discerning only a few hundred at a conscious level smaller differences are noticeable as anomalies at an unconscious level.

This process is also monitor-dependent, to the extent that different computer monitors display slightly different colours, shades and hues, producing latent anomalies that can become apparent when the animated object is displayed on a different monitor or incorporated into a composite cinematographic scene. Differences between animated and real-world colours, shades and hues which may have been indistinguishable to visual effects artists, either due to the characteristics of the computer monitor used or due to the inability of the human eye to distinguish between fine differences in colours, shades and hues, can become apparent in the composite image and can destroy the believability of the visual effect.

This problem is exacerbated by the numerous factors which can affect the lighting of a cinematographic scene, including the positioning, orientation, luminous intensity and colour of each light source, changes in luminous intensity and colour due to filters, dimmers and light occlusion by opaque objects, diffusion and attenuation due to the position of the animated object, optical transmission characteristics of the camera lens, the sensitivity of the cinematographic film used in filming the scene, film colour balance, frame rates and shutter openings. All of these factors combine to create many diverse and unique lighting effects in a cinematographic scene, and while this diversity is useful to directors of lighting and cinematography in practising their craft, the resulting lighting effects can be extremely difficult even to approximate in a computer model, let alone duplicate.

It would accordingly be advantageous to provide a method and apparatus for applying lighting effects to a three dimensional computer animated object which are consistent in all respects with the lighting effects used on a real-world cinematographic set, such that upon integrating the animated object into the cinematographic scene to form a composite cinematographic image, the animated object is indistinguishable from a comparable physical object occupying the same position and performing the same motion as the computer animated object.

SUMMARY OF THE INVENTION

The present invention provides a method and apparatus for reproducing real-world (physical) lighting effects in a three dimensional computer model. The invention provides a means for quantifying photographic and cinematographic lighting parameters from physical light sources and cameras into photometric data, to create computer generated synthetic light sources that synthetically reproduce the physical lighting used on a physical set and are thus suitable for the rendering of three dimensional computer models that blend seamlessly into a cinematographic scene.

According to the invention, a three dimensional virtual set is created to a scale in proportion to the physical set. The position, orientation, and optical parameters of the physical light sources used on the real-world set are input into the model and adjusted to account for effects such as dimming, filtration, diffusion, occlusion and attenuation to produce synthetic light sources in the virtual set which mimic the physical light sources on the physical set. This procedure is repeated for each light source to create synthetic lighting corresponding to the lighting of the physical set. The lens transmission characteristics of the camera lens and sensitivity of the film may be incorporated into the synthetic lighting parameters, and the viewpoint is selected to correspond with the position of the camera. The animated object is positioned and oriented within the virtual set according to the position and orientation in which the visual effect is to appear in the cinematographic scene, and the synthetic light sources, adjusted to account for diffusion, attenuation and occlusion, are applied to the animated object.

The computer animated object is thus synthetically 'illuminated' within the virtual set in exactly the manner that a physical object of the same shape in the physical set would have been illuminated, using measurements taken from the actual parameters used on the physical set. The invention thereby significantly reduces the labour and judgment required on the part of visual effects artists trying to reproduce the lighting effects in the composite scene ad hoc, by simulating the actual physical lighting and camera parameters as selected by the directors of lighting and photography. The invention accordingly substantially reduces the time required to integrate the visual effects object into a cinematographic scene, and the result is a visual effects object that is very realistic in appearance.

In the preferred embodiment optical parameters of various light sources, filters, cameras and films are maintained in a database or look-up table and can thus be applied to the virtual set by reference to the actual devices used on the real-world set. Other factors which are set-dependent, such as filtration, dimming and occlusion caused by opaque objects between the light source and the object position, are measured on the physical set and reproduced in the computer model. The visual effects artist need only position the animated object in each frame, and the computer applies the appropriate lighting effects to the surfaces of the animated object.

The present invention thus provides a method of reproducing in a three dimensional computer animated object lighting effects generated by light sources on a physical set, comprising the steps of inputting data corresponding to metric parameters of the physical set to generate a virtual set scaled in proportion to the physical set, inputting data corresponding to the positions and orientations of the light sources to generate synthetic light sources in the virtual set in positions and orientations corresponding to positions and orientations of corresponding physical light sources on the physical set, calculating effective luminous intensity and effective colour component parameters of the physical light sources, inputting data to position the computer animated object in the virtual set, and applying the effective luminous intensity and effective colour component parameters of the physical light source to the data.

The present invention further provides an apparatus for reproducing in a three dimensional computer animated object lighting effects produced by physical light sources on a physical set captured by a camera, comprising a computer having a computer monitor and software for generating data corresponding to metric parameters of the physical set to generate a virtual set scaled in proportion to the physical set, generating data corresponding to positions and orientations of the light sources to generate synthetic light sources in the virtual set in positions and orientations corresponding to positions and orientations of corresponding physical light sources on the physical set, calculating effective luminous intensity and effective colour component parameters of the physical light sources, generating a representation of the computer animated object in the virtual set, and applying the effective.

The present invention further provides a computer program product for use with a device for producing a representation of a three dimensional computer animated object and generating therein lighting effects corresponding to lighting effects produced by physical light sources on a physical set captured by a camera, the computer program product comprising computer readable program code for causing a computer to generate a representation of a virtual set scaled in proportion to the physical set, computer readable program code for causing a computer to generate synthetic light sources in the virtual set in positions and orientations corresponding to positions and orientations of corresponding physical light sources on the physical set, computer readable program code for causing a computer to calculate effective luminous intensity and effective colour component parameters of the synthetic light sources corresponding to effective luminous intensity and effective colour component parameters of the light sources, and computer readable program code for applying the effective luminous intensity and effective colour component parameters to the representation of the computer animated object to reproduce therein lighting effects corresponding to those of the physical set.

BRIEF DESCRIPTION OF THE DRAWINGS

In drawings which illustrate by way of example only a preferred embodiment of the invention.

DETAILED DESCRIPTION OF THE INVENTION

Figure 1:
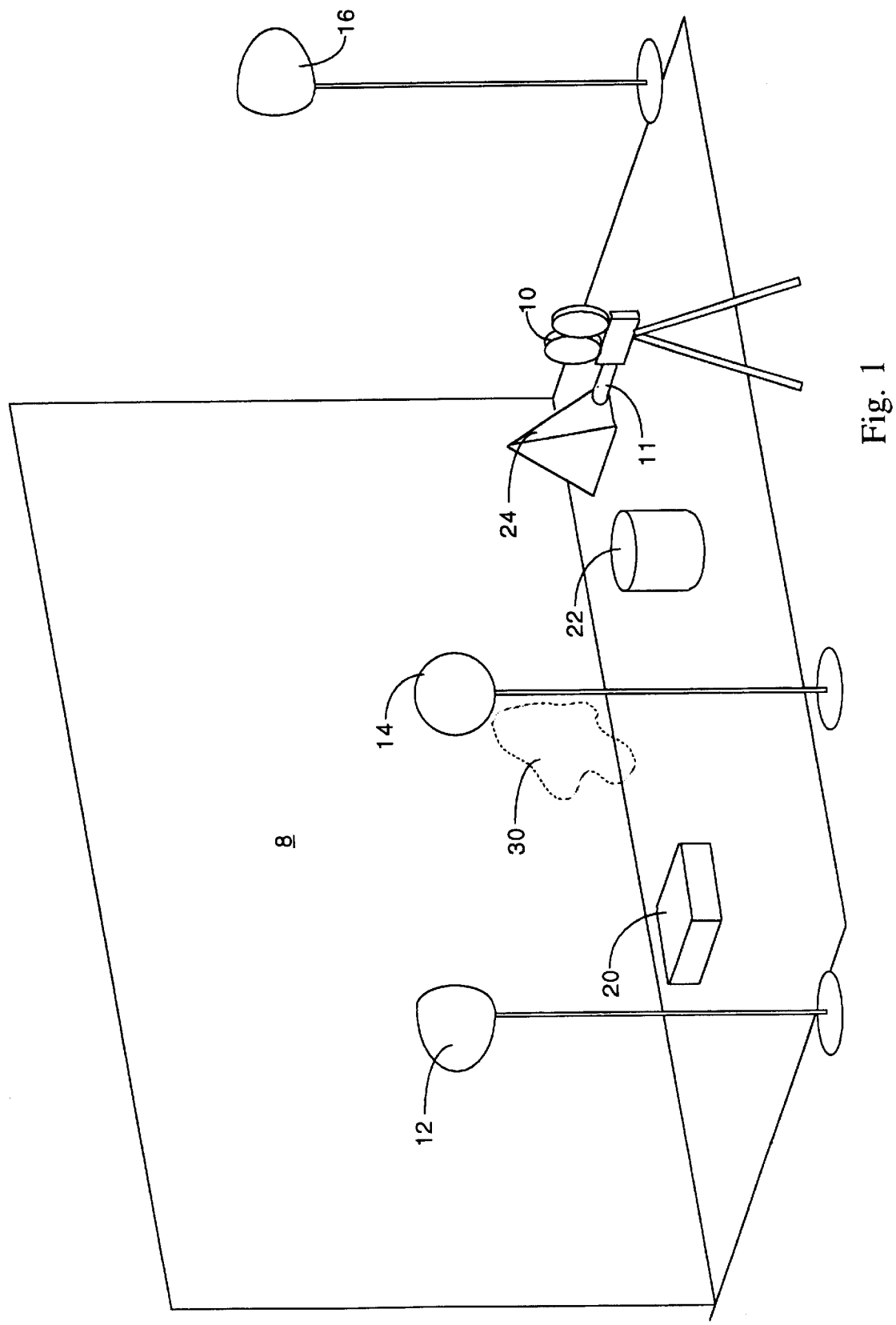
FIG. 1 is a schematic view of a real-world set into which a computer animated visual effect will be incorporated.

FIG. 1 illustrates by way of example a real-world or "physical" set for photographing a scene onto cinematographic film in a camera 10 having a lens 11. Light sources 12, 14, 16 are positioned about the set for illuminating a backdrop 8 and objects 20, 22, 24, which for purposes of illustration are stationary objects positioned according to instructions from the set director. The visual effects artist will create a three dimensional computer model of an animated object, in this example a fictitious creature 30 shown in phantom in FIG. 1 in the position in which the model 30 will be superimposed upon the cinematographic reproduction of the physical set.

According to the invention, a virtual set, ie. a three dimensional computer model of the physical set of FIG. 1, is created on a suitable computer such as a personal computer supporting a MacOS, Windows 95, Windows 98 or Windows NT (trademarks) environment, or a workstation level computer such as a Silicon Graphics (trademark) workstation, running computer animation software such as Lightwave, Houdini, 3D Studio Max (trademarks) or any other suitable computer animation software package. The virtual set is created from the viewpoint of the camera location, using software subroutines presently available in three dimensional modeling software. However, commercially available software merely allows the visual effects artist to specify the position of one or more synthetic light sources, and then applies basic rules of simple theoretical optics to generate lighting effects that inadequately mimic realistic three dimensional reflection or illumination patterns along the contours of the various surfaces of the animated object.

The invention provides software subroutines for synthetically lighting the virtual set using parameters taken from the physical set and/or manufacturer's specifications for the camera, film and light sources 12, 14, 16 used on the physical set. The synthetic light sources 12a, 14a, 16a created by the modeling software according to the invention reproduce the effects of the light sources 12, 14, 16, respectively, used on the physical set adjusted to account for the transmission characteristics of the camera lens 11 and the sensitivity of the film used on the physical set. The synthetic light sources are also adjusted to account for the positioning of the animated object 30, to create lighting effects which mimic the lighting effects on the physical set.

In summary, a preferred embodiment of the method of the invention involves creating a virtual set scaled in proportion to the physical set, positioning synthetic light sources 12a, 14a, 16a in the virtual set in positions and orientations corresponding to the positions and orientations of the corresponding physical light sources 12, 14, 16 on the physical set, determining the effective luminous intensity and colour components of the physical light sources, positioning and orienting the computer generated object in the virtual set, and compensating for the positions and orientations of the light sources and camera relative to the computer generated object to create a three dimensional animated object.

Figure 2:
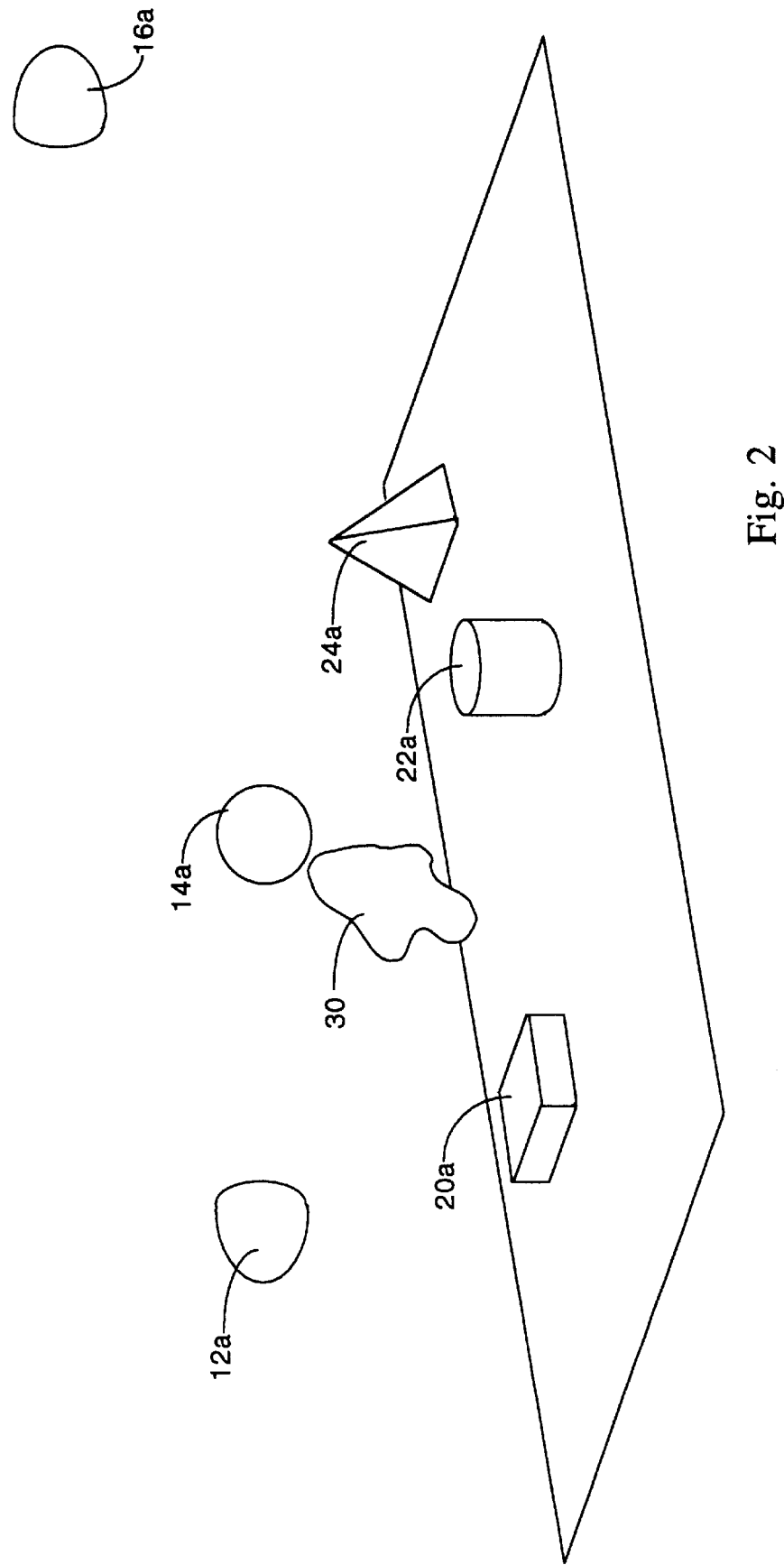
FIG. 2 is a schematic view of a computer model of a virtual set corresponding to the real-world set of FIG. 1 in which a computer animated visual effect creature will be rendered for superimposition into a cinematographic reproduction of the set of FIG. 1.

In the preferred embodiment of the invention, the following steps may be performed in the method of the invention:

Constructing the Virtual Set (a) Measuring the physical set: The perimeter distances of the physical set and the positions of the camera 10, light sources 12, 14, 16, and objects 20, 22, 24 are measured directly from the physical set, for example the set shown in FIG. 1. A three dimensional computer model of a "virtual set" corresponding to the physical set, as shown in FIG. 2, is constructed by the software conventionally using a unit-based coordinate system, the "unit" being centimeters, inches, feet, metres or any arbitrary unit of measurement, input from the measurements of the physical set. The computer generates a three dimensional image which replicates the virtual set. The computer animated object 30 can be positioned in the virtual set at this stage, or at any time before the combined effective luminance/colour space photometric parameters of the synthetic light sources 12a, 14a, 16a are adjusted for diffusion, attenuation and occlusion after step (1), below.

(b) Scaling the Virtual Set: The measurements taken in step (a) are scaled by a scaling factor, which represents the square of the number of units which equal one foot if luminous intensity is measured in footcandles, or the square of the number of units which equal one meter if luminous intensity is measured in lux. This can be represented as

SCALE=BASE_UNITS$^2$ in which SCALE represents the square of the number of computer coordinate units that are in one foot (if the calculation is in foot-candles) or the number of computer coordinate units that are in one metre (if the calculation is in lux).

Calculating the Effective Luminous Intensity of the Synthetic Light Sources (c) Determining peak luminous intensity: The luminous intensity of a physical light source is measured in candelas. Candelas indicate brightness only and are independent of colour. For most light sources a peak candelas value is supplied with the manufacturer's specifications. Peak candelas can also be measured at the physical light source 12, 14, 16 using a conventional light meter, which in many cases will produce a more accurate result because luminous intensity varies somewhat with the age of the light source. This information can be maintained in a database or look-up table cross-referenced to the light source brand and model.

The peak luminous intensity is the sum of the peak beam intensity (PBI) of the light source at full flood plus the spot value of the light source (0=full flood and 1=full spot), multiplied by the difference of the peak beam intensity of the light source at full spot and the peak beam intensity of the light source at full flood, or

CANDELAS=FLOOD_PBI+(SPOT_VALUE×(SPOT_PBI-FLOOD_PBI))

If the light is fixed focus, the flood and spot peak beam intensities will be the same and the spot value is ignored.

In the preferred embodiment of the invention the peak luminous intensity is then cumulatively reduced in each of the following steps, as applicable in each particular case, to determine the Effective Luminous Intensity of the synthetic light source:

(d) Adjusting for dimming: A dimmer may be used to reduce either the voltage or the current supplied to a physical light source. The dimmer reduces the luminous intensity of the light produced by that light source. In this step the luminous intensity of the synthetic light source is multiplied by the square of the adjusted light output percentage of the corresponding physical light source, ie. the ratio of the actual power supplied to the physical light source relative to the nominal power of the power supply, expressed as a value between 0 and 1, to account for dimming of the light source:

$$DIMMER=DIM\_VALUE^2$$

(A dimmer pack may conventionally provide a scale from 1 to 100 or 1 to 140, which is converted to a percentage value between 0 and 1 for this calculation step.)

(e) Compensating for filtration: One or more filters may be placed in front of a light source, or in front of the camera lens 11, to reduce the luminous intensity of light striking the camera lens 11. The total loss of light transmission due to filtration is measured either as a stop loss or as a transmission percentage. In this step the luminous intensity of the synthetic light source is reduced by dividing by 2 to the power of the stop loss, as supplied with the manufacturer's specifications and optionally maintained in a database or look-up table, or by multiplying by the transmission percentage as measured at the corresponding physical light source, to account for filtration of each light source.

$$TRANSMISSION=1/(2^{STOP\_LOSS})$$

This value can also be calculated as a transmission percentage determined by actual measurement.

(f) Compensating for t-stop: The transmission characteristics of the camera lens 11 do not affect lighting characteristics of the light sources 12, 14, 16. However, the extent of exposure of the cinematographic medium (for example film, videotape, digital storage media etc.) is affected by the percentage of light passing through the camera lens, determined by the lens aperture which is defined as the "t-stop" of the camera lens 11. In this step the luminous intensity is divided by two to the power of the lens aperture of the camera lens 11, to account for reduction of light transmitted through the camera lens 11:

$$T\cdot STOP=1/(2^{LENS\_APERTURE}).$$

It may be possible for computer rendering software packages to compensate for light loss due to the transmission characteristics of the camera lens, in which case this step becomes unnecessary (ie. T·STOP=1).

(g) Compensating for camera shutter angle: Although the shutter angle of a camera 10 does not affect light sources on a physical set, the shutter angle determines the proportion of total exposure time per frame that any given grain in the film is exposed. A 172.8° shutter angle (which is the standard shutter opening) would expose each grain in the film for one half of the total frame exposure time. In this step the luminous intensity is multiplied by 172.8 and divided by the shutter angle, to compensate for the shutter angle of the camera 10:

$$SHUTTER=172.8/CAMERA\_SHUTTER$$

If the computer rendering software package already compensates for shutter angle, this step becomes unnecessary (ie. SHUTTER=1).

(h) Compensating for camera frame rate: The frame rate (in frames per second) determines how many frames of the cinematographic medium are captured (eg. exposed in the case of film) each second. The standard film frame rate is 24 frames per second. The exposure time of each frame will decrease in inverse proportion to the frame rate. In this step the luminous intensity is multiplied by the camera frame rate and divided by 24, to compensate for the frame rate of the camera 10:

$$FPS=FRAME\_RATE/24$$

If the computer rendering software package already compensates for frame rate, this step becomes unnecessary (ie. FPS=1).

(i) Accommodating the exposure index: The exposure index indicates the sensitivity of the film to light. The extent of exposure of the cinematographic film affects the resulting illumination of the scene as captured by the film in the camera 10. By convention film with an exposure index of 1250 exposed through a camera lens with a t-stop of 1.0 (no optical transmission loss through the lens 11), a frame rate of 24 frames per second and a shutter angle of 172.80° requires one footcandle of light to be properly exposed. In this step the luminous intensity is multiplied by the exposure index of the film and the result is divided by 1250 to account for the exposure index of the film:

$$EI=EXPOSURE\_INDEX/1250$$

The exposure index may be supplied with the manufacturer's specifications and optionally stored in a database or look-up table. If the computer rendering software already compensates for exposure index, this step becomes unnecessary (ie. EI=1).

Steps (c) through (i) can be performed separately for each physical light source 12, 14, 16 as necessary. Since steps (f) through (h) are camera-dependent and step (i) is film dependent, and thus common to all light sources on the set, these values can alternatively be entered once, for example when defining the first light source, and applied to all light sources in the virtual set. Also, steps (g) and (i) are relevant only to a camera that uses cinematographic film; in the case of a video camera, a digital camera or any future technology which uses a cinematographic medium other than film, all of which are contemplated within the scope of the present invention, steps (g) and (i) become unnecessary and the values for these parameters default to 1.

The invention uses these parameters to assign a corresponding value for Effective Luminous Intensity (ELI) to each synthetic light source 12a, 14a, 16a, according to the equation $$ELI=SCALE \times CANDELAS \times DIMMER \times TRANSMISSION \times \\ TSTOP \times SHUTTER \times FPS \times EI$$

It will be appreciated that steps (c) through (i) may be performed in any order, each step potentially reducing the peak luminous intensity value calculated in step (c) until the Effective Luminous Intensity of each synthetic light source 12a, 14a, 16a has been calculated.

Calculating the Effective Colour Temperature of the Synthetic Light Sources

Ultimately, any method of converting real-world lighting parameters into synthetic light photometric data suitable for the rendering of three dimensional computer models must distill the components of physical light sources into some form of digital colour space, for example RGB (red green blue), which is currently the standard for defining colour in the computer industry in North America. Other examples of colour space standards include CIE XYZ (Commission Internationale de L'Eclairage XYZ coordinate triplet); CMYK (cyan, magenta, yellow black); and HSL (hue saturation lightness).

(j) Determining the base colour temperature: Colour temperature is independent of brightness. The colour component of continuous colour spectrum light emitted from a light source is typically measured in degrees Kelvin (°K). This is a quantification of heating of a blackbody radiator to temperatures sufficient to emit a desired colour of light. Light dominant in the yellow-orange range of the visible spectrum is emitted when the blackbody radiator reaches a temperature of approximately 3200° K. Light dominant in the blue range of the visible spectrum is emitted when the blackbody radiator reaches a temperature of approximately 5600° K. The colour component of a light source is measured against this blackbody radiator scale. In this step the Base Colour Temperature of the physical light source is quantified, as measured at the physical light source or supplied with the manufacturer's specifications. This information can optionally be stored in a database or look-up table.

(k) Adjusting for changes in colour temperature due to dimming: Dimmers attached to the physical light source will reduce not only the luminous intensity, but also the colour temperature of the light source. The colour temperature of incandescent and tungsten halogen light decreases when dimmed. The colour temperature of metal halide light increases when dimmed. Other types of lights either cannot be dimmed or exhibit negligible changes in colour temperature when dimmed. In this step the colour temperature of the synthetic light source is adjusted according to any change in the colour temperature of the corresponding physical light source due to dimming, as measured at the physical light source. The Base Colour Temperature assigned to the synthetic light source is changed corresponding to any alteration in the colour temperature of the corresponding physical light source due to dimming, according to the formula:

DIM_COLOUR_TEMPERATURE=(1−DIM_VALUE)×MULTIPLIER

MULTIPLIER for incandescent and tungsten halogen light sources, the colour temperature of which is reduced by dimming, is −1000 for 120V systems or −500 for 240 V systems; for metal halide light sources, the colour temperature of which is increased by dimming, MULTIPLIER is +1000 for 120V systems or +500 for 240 V systems.

The Adjusted Colour Temperature is calculated according to the following formula:

ADJUSTED_COLOUR_TEMPERATURE=BASE_COLOUR_TEMPERATURE +DIM_COLOUR TEMPERATURE (l) Adjusting for changes in colour temperature due to filtration: It is common to filter light through a material specifically designed to change the colour temperature of the emitted light, and some filters used to reduce luminous intensity will also change the colour temperature of the physical light beam. For individual light source control such filters are positioned directly in front of the light source; to effectively change the colour temperature of all light sources simultaneously, one or more such filters are positioned directly in front of the camera lens 11. The effect that this class of filters has on colour temperature is relative to the Adjusted Colour Temperature of the light. A filter placed in front of a 3200° light will alter the colour temperature to a different degree than the same filter placed in front of a 5600° light. For this reason the effect of this class of filters is measured in microreciprocal degrees (MIRED). The MIRED values, supplied by the manufacturer, of all filters in front of the light source are added together, and summed with the MIRED values of all filters placed in front of the camera lens 11, to produce the accumulative filter MIRED (FILTER_MIREDS) value.

In this step the colour temperature of the synthetic light is calculated by converting the Adjusted Colour Temperature to a MIRED value, by dividing the Adjusted Colour temperature into 1,000,000:

BASE_MIREDS=1,000,000/ADJUSTED_COLOUR_TEMPERATURE

The accumulated filter MIRED (FILTER_MIREDS) value is added to the BASE_MIREDS value to produce the total microreciprocal degree value for the synthetic light source:

TOTAL_MIREDS=BASE_MIREDS+FILTER MIREDS

The total MIREDS value is then converted into an Effective Colour temperature by dividing the total MIREDS value into 1,000,000:

EFFECTIVE_COLOUR_TEMPERATURE=1,000,000/TOTAL_MIREDS

The Effective Colour Temperature of the light source is then converted into digital colour space using standard colour temperature to colour space conversion routines to produce the Base Colour Component of the light.

The colour components of the light source are adjusted as follows:

(m) Adjusting for changes in colour due to filtration: The effect of some filtration materials on colour temperature is incalculable, and these filters thus have no MIRED value. Filters designed specifically as colour filters remove only a targeted portion of the visible spectrum from the light source being filtered, in that colours common to the light source and the filter are transmitted through the filter. For individual light source control such filters are positioned directly in front of the light source; to effectively change the colour of all light sources simultaneously, one or more such filters are positioned directly in front of the camera lens 11. In this step the colour space component values of the synthetic light source are adjusted according to any change in colour of the physical light source due to filtration, as measured at the camera lens 11.

Depending on the colour space used (RGB, CMYK, XYZ etc.), the filter values are added to, subtracted from, multiplied by or otherwise adjusted for to produce the Adjusted Colour Component of the synthetic light:

ADJUSTED_COLOUR_COMPONENT=func(BASE_COLOUR_COMPONENT, FILTER_COLOUR)

where the function applied to BASE_COLOUR_COMPONENT and FILTER_COLOUR is the operation appropriate for the particular colour space used (RGB, CMYK, XYZ etc.). For example, in RGB colour space the adjusted component equals the complement of the sum of the complements of BASE_COLOUR_COMPONENT and FILTER_COLOUR, as follows:

ADJUSTED_RED=1−((1−BASE_RED)+(1−FILTER_RED))

ADJUSTED_GREEN=1-((1-BASE_GREEN)+(1-FILTER_GREEN))

ADJUSTED_BLUE=1-((1-BASE_BLUE)+(1-FILTER_BLUE))

The function applied to determine ADJUSTED_COLOUR_COMPONENT for each type of colour space is well known to those skilled in the art.

(n) Adjusting for changes in colour due to the colour balance of the film: Although the spectral sensitivity (colour balance) of the film does not directly affect physical lights on the set, but rather affects how light is rendered, or captured, on the film, the synthetic lights can be adjusted to compensate for film colour balance.

Film is typically comprised of three colour sensitive layers (red, green, blue). The sensitivity of the film layers is assigned a value which represents the degree to which each layer is sensitive to light. Typically each layer is assigned a value from 0 to 1, where 0 represents absence of sensitivity to light and 1 represents total sensitivity to light. These values are converted into digital colour space using standard conversion routines.

In this step the values representing spectral sensitivity of the film are converted into digital colour space to generate the Effective Colour Space value of the light source. Depending on the colour space used (RGB, CMYK, XYZ etc.), the film balance are added to, subtracted from, multiplied by or otherwise adjusted for to produce the Effective Colour Component of the synthetic light:

EFFECTIVE_COLOUR_COMPONENT=func(ADJUSTED_COLOUR_COMPONENT, FILM_BALANCE)

where the function applied to ADJUSTED_COLOUR_COMPONENT and FILM_BALANCE is the operation appropriate for the particular colour space used (RGB, CMYK, XYZ etc.).

Once steps (j) through (n) have been performed for each physical light source 12, 14, 16, the adjusted digital colour space values determine the Effective Colour Space of the physical light sources 12, 14, 16. Steps (k) and (l) further adjust the base colour temperature values calculated in step (j) to determine the Effective Colour Temperature, and steps (m) and (n) further adjust the colour component values calculated in step (l), until the Effective Colour Space of each synthetic light source 12*a*, 14*a*, 16*a* has been calculated. Step (n) is relevant only to a camera that uses cinematographic film; in the case of a video camera, a digital camera or any future technology which uses a cinematographic medium other than film, step (n) becomes unnecessary and the value for this parameter defaults to 1 (ie. Effective Colour Component=Adjusted Colour Component).

Calculating the Effective Brightness/Colour of the Synthetic Light Sources (o) Calculating effective brightness/colour: In this step each Effective Colour Component value is multiplied by the Effective Luminous Intensity to produce the Effective Light Value (ELV) which represents the effective luminance/colour space photometric parameters of the synthetic light source:

ELV=EFFECTIVE_LUMINOUS_INTENSITY×EFFECTIVE_COLOUR_COMPONENT

This is an ambient value, independent of the position of the animated object 30.

Adjusting for Diffusion, Attenuation and Occlusion

A three dimensional model of the animated object 30 must now be incorporated into the virtual set (if not previously incorporated) in order to take into account adjustments which are dependent upon the position of the animated object 30. The following parameters are calculated by a software component known as a "shader", which may be included in a conventional computer rendering software package:

(p) Adjusting for light attenuation due to distance: Divergent light, ie. light that does not have perfectly parallel beams, diminishes in intensity over distance. This attenuation is defined by the inverse square falloff law. The intensity of the light at any distance from the light source is equal to the Effective Luminous Intensity of the light source divided by the square of the distance from the source. In this step the effective luminance/colour space photometric parameters of the synthetic light source are reduced to account for light attenuation due to the distance from the light source to the animated object 30, by dividing each component luminance/colour space value by the square of the distance of the object 30 from the physical light source 12, 14 or 16. If the distance from the light source is measured in feet, then the result of peak candelas divided by the square of the distance is footcandles; if measured in metres, the result is lux.

(q) Determining light attenuation due to angle from optical axis: As a beam of light diverges from its optical axis, it diminishes in luminous intensity. The brightness of a light source at any point offset from its optical axis is a function not only of its attenuation due to distance from the source (determined in step (o), above), but also the angle between the optical axis of the light source and a line between the light source and the object. In this step the combined effective luminance/colour space photometric parameters of the synthetic light source are further reduced by the cosine of the angle between the optical axis of the light source and a line between the light source and the animated object 30, to account for attenuation due to beam offset.

Steps (p) and (q) are necessary to account for the position of the animated object 30 in the virtual set. It will be appreciated that steps (p) and (q) may be performed in any order, each step further adjusting the brightness/colour space parameters calculated in step (o) until the effective colour values of the physical light sources 12, 14, 16 have been ascertained. In addition, the following optional steps may be performed:

(r) Adjusting for diffusion due to focus: Many physical lighting sources can be focused or defocused in order to control the diffusion of their light beams. A light with a narrowly focused beam exhibits a more orderly manner of beam distribution, whereas a light with a widely focused beam exhibits a more random pattern of beam distribution. In this step a value representing an empirical determination of the sharpness of shadows, for example in the range between 0 and 1 where 0 is a perfect shadow and 1 is an almost indiscernible shadow, is applied to the shadow quality of the synthetic light sources.

(s) Adjusting for diffusion due to filtration: Filtration placed in front of a light source will cause the beam of light to scatter in a more random pattern. In this step the shadow quality of the synthetic light sources are adjusted to account for diffusion due to filtration of the light beam.

(t) Accommodating light occlusion: A beam of light from a light source can be controlled and shaped through the use of opaque material. The light can be controlled at the source, or by positioning an opaque object such as the object 22 at a selected distance between the light source and the target object. In this step the combined effective luminance/colour space photometric parameters of the synthetic light source are further reduced by the construction of three dimensional computer generated geometric models 20a, 22a, 24a corresponding to opaque objects 20, 22, 24 interposed between the synthetic light source the position of the animated object 30 on the physical set, to duplicate occlusion created on the physical set. Types of occlusion include gobos, cucalorises, tree branches and flags.

Steps (r) through (t) may be performed in any order for each physical light source 12, 14, 16, following which the adjusted combined brightness/colour space parameters, shadow quality and light occlusion correspond almost exactly to those on the physical set at the position corresponding to that of the computer animated object 30 on the virtual set.

These parameters are applied to the animated computer object 30, which can then be extracted from the virtual set and superimposed onto a frame of the cinematographic medium in conventional fashion. Some degree of adjustment may be required to match the animated lighting effects with those used on the physical set, however the adjustments to the animated lighting effects will in general be minor.

It will be appreciated that not all steps will be required for every physical set. This depends upon the presence or absence of filters, dimmers, occluding objects etc. that will affect the lighting of the cinematographic reproduction of the physical set. Each step is performed only as required in each particular situation.

It will also be appreciated that new methods of controlling and manipulating light are constantly being developed in the film industry. Regardless of the modification technique employed on the physical set, the resultant photometric data is always measurable. The present invention will accommodate any light modification technique or device used on the physical set in accordance with the method described above.

A preferred embodiment of the invention having been thus described by way of example only, it will be apparent to those skilled in the art that certain modifications and adaptations may be made without departing from the scope of the invention, as set out in the appended claims.

I claim:

1. A method of reproducing in a three dimensional computer animated object lighting effects generated by light sources on a physical set, composing the steps of:
   (a) inputting data corresponding to metric parameters of the physical set to generate a virtual set scaled in proportion to the physical set,
   (b) inputting data corresponding to the positions and orientations of the light sources to generate synthetic light sources in the virtual set in positions and orientations corresponding to positions and orientations of corresponding physical light sources on the physical set
   (c) calculating effective luminous intensity and effective colour component parameters of the physical light sources, including determining a peak luminous intensity of each physical light source,
   (d) reducing the peak luminous intensity to account for transmission characteristics of a lens of the camera,
   (e) reducing the peak luminous intensity to account for a shutter angle of the camera,
   (f) reducing the peak luminous intensity to account for an exposure index of cinematographic film used in the camera,
   (g) inputting data to position the computer animated object in the virtual set, and
   (h) applying the effective luminous intensity and effective colour component parameters of the physical light sources to the data representing the synthetic light sources to reproduce in the virtual set lighting effects corresponding to those of the physical set to thereby generate lighting effects on the computer animated object which correspond to lighting effects in the physical set.

2. The method of claim 1 including the step of reducing the peak luminous intensity to account for dimming of each physical light source.

3. The method of claim 1 including the step of reducing the peak luminous intensity to account for filtration of each physical light source.

4. The method of claim 2 including the step of reducing the peak luminous intensity to account for a frame rate of the camera.

5. The method of claim 1 in which step (b) includes the step of determining a base colour temperature of each light source.

6. The method of claim 5 including the step of adjusting the colour temperature to account for dimming.

7. The method of claim 1 including the step of reducing the peak luminous intensity to account for a frame rate of the camera.

8. The method of claim 5 including the step of adjusting a colour of each synthetic light source to account for filtration.

9. The method of claim 5 including the step of adjusting a colour of each synthetic light source to account for a colour balance of film in the camera.

10. The method of claim 1 in which step (e) includes the step calculating an effective light value for each light source.

11. The method of claim 10 including the step of adjusting the effective light value to account for attenuation of each light source due to distance from each light source to the computer animated object.

12. The method of claim 10 including the step of adjusting the effective light value to account for attenuation of each light source due to an angle between an optical axis of each light source and a line between each light source and the computer animated object.

13. The method of claim 10 including the step of adjusting for diffusion of each light source to account for a focus of the light.

14. The method of claim 10 including the step of adjusting for diffusion of each light source to account for filtration.

15. The method of claim 10 including the step of adjusting for occlusion of each light source due to any opaque object disposed between each light source and the computer animated object.

16. A product produced according to the method of claim 1.

17. An apparatus for reproducing in a three dimensional computer animated object lighting effects produced by physical light sources on a physical set captured by a camera, comprising a computer having a computer monitor and software for:
   a) generating data corresponding to metric parameters of the physical set to generate a virtual set scaled in proportion to the physical set,
   b) generate data corresponding to positions and orientations of the light sources to generate synthetic light sources in the virtual set in positions and orientations corresponding to positions and orientations of corresponding physical light sources on the physical set,
   c) calculating effective luminous intensity and effective colour component parameters of the physical light sources, including determining a peak luminous intensity of each physical light source, (d) reducing the peak luminous intensity to account for transmission characteristics of a lens of the camera, (e) reducing the peak luminous intensity to account for a shutter angle of the camera, (f) reducing the peak luminous intensity to account for an exposure index of cinematographic film used in the camera, (g) generating a representation of the computer animated object in the virtual set, and (h) applying the effective luminous intensity and effective colour component parameters of the physical light sources to tho data representing the synthetic light sources to reproduce in the virtual set lighting effects corresponding to those of the physical set to thereby generate lighting effects on the computer animated object which correspond to lighting effects in the physical set.

18. A computer program product for use with a device for producing a representation of a three dimensional computer animated object and generating therein lighting effects corresponding to lighting effects produced by physical light sources on a physical set captured by a camera, the computer program product comprising:

a) computer readable program code for causing a computer to generate a representation of a virtual set scaled in proportion to the physical set, b) computer readable program code for causing a computer to generate synthetic light sources in the virtual set in positions and orientations corresponding to positions and orientations of corresponding physical light sources on the physical set, (c) computer readable program code for causing a computer to calculate effective luminous intensity and effective colour component parameters of the synthetic light sources corresponding to effective luminous intensity and effective colour component parameters of the light sources, (d) computer readable program code for causing a computer to reduce the peak luminous intensity to account for transmission characteristics of a lens of the camera, (e) computer readable program code for causing a computer to reduce the peak luminous intensity to account for a shutter angle of the camera, (f) computer readable program code for causing a computer to reduce the peak luminous intensity to account for an exposure index of cinematographic film used in the camera, and (g) computer readable program code for applying the effective luminous intensity and effective colour component parameters to the data representing the synthetic light sources to reproduce in the virtual set lighting effects corresponding to those of the physical set to thereby generate lining effects on the computer animated object which correspond to lighting effects in the physical set.

* * * * *